UNITED STATES PATENT OFFICE.

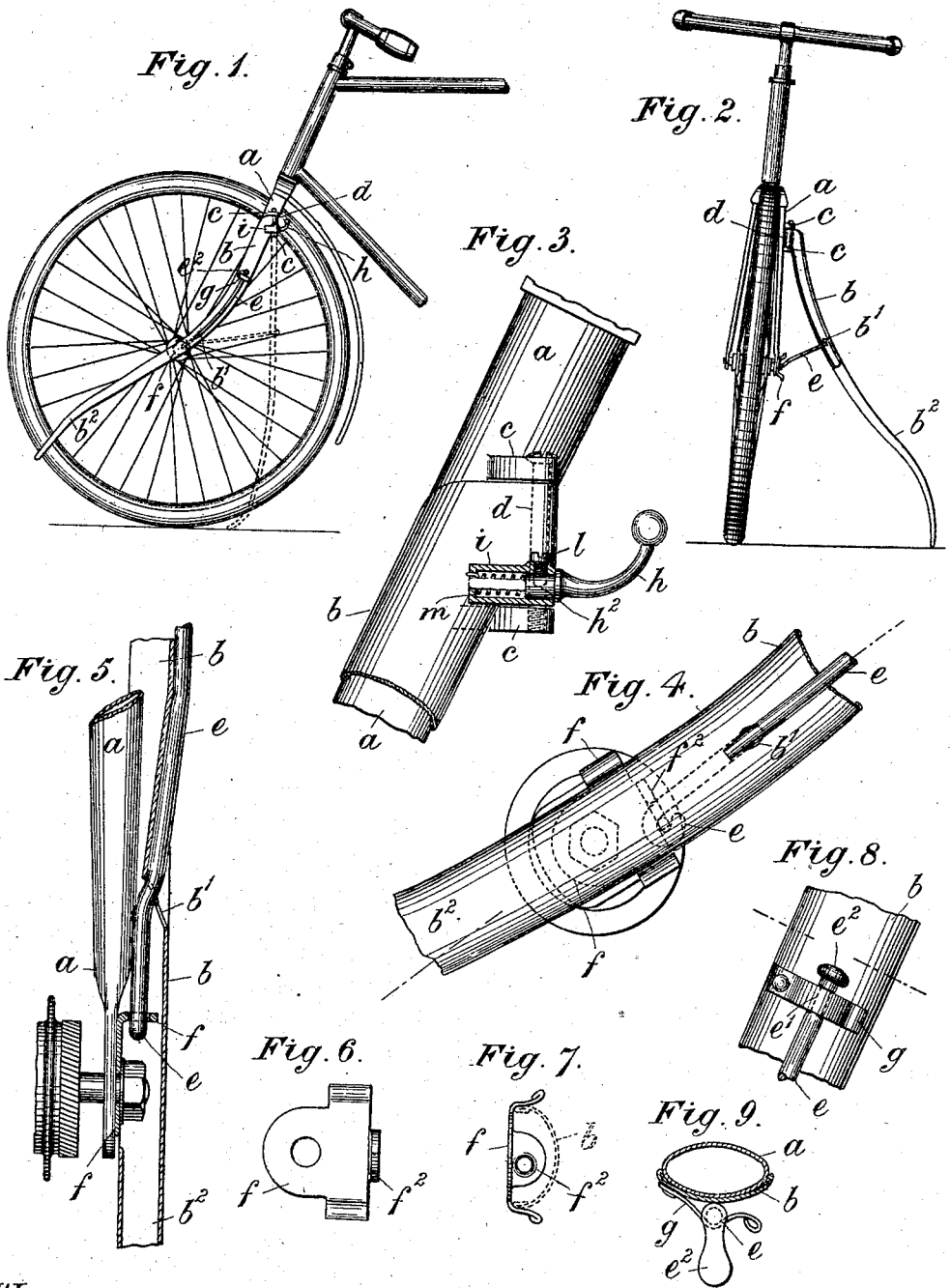

EDWIN GEORGE MAY, OF ASTON MANOR, ENGLAND.

BICYCLE-SUPPORT.

No. 840,357.  Specification of Letters Patent.  Patented Jan. 1, 1907.

Application filed April 16, 1906. Serial No. 311,979.

*To all whom it may concern:*

Be it known that I, EDWIN GEORGE MAY, a subject of the King of Great Britain, residing at Aston Manor, England, have invented certain new and useful Improvements in Bicycle-Supports, of which the following is a specification.

My invention consists of the new or improved bicycle or motor-bicycle stay or support hereinafter described, by the use of which a bicycle or motor-bicycle may be supported when at rest without requiring to be placed against a wall or other vertical support, the said stay or support being so hinged to one of the arms or branches of the steering-wheel fork, preferably the left-hand arm or branch, that when in its out-of-use position it occupies a position adjacent thereto and apparently forms a continuation thereof, the extreme end or foot having a hook shape and crossing the front of the tire of the bicycle-wheel at a point about five inches above the ground. The stay or support when turned out on its hinge-joint into its supporting position constitutes a prop which preserves the bicycle at rest.

I will now proceed to further describe my invention with reference to the accompanying drawings, in which—

Figure 1 represents in side elevation the front portion of a bicycle or motor-bicycle to which the new or improved stay or support constituting my invention is applied, the said stay or support being represented in full lines in its normal or out-of-action position and being indicated in dotted lines in its acting or supporting position. Fig. 2 is a front elevation of the bicycle with the stay or support in its acting or supporting position. Figs. 3 to 9, both inclusive, represent parts of the stay or support and its connection with the bicycle, hereinafter particularly described, drawn to a larger scale than Figs. 1 and 2.

The same letters of reference indicate the same parts in the several figures of the drawings.

At or near the upper end of, say, the left-hand arm or branch $a$ of the steering-wheel fork I provide a hinge-joint by which the stay or support $b\ b^2$ is hinged to the fork-arm $a$, the joint-pin $d$ of the hinge being vertical or nearly vertical. The upper portion $b$ of the stay has a trough-shaped figure in cross-section, being shaped to fit or approximately fit the arm or branch $a$ of the fork, and the lower portion $b^2$ of the stay is tubular and gradually tapers toward its lower or foot end. The fixed knuckles $c\ c$ of the stay-hinge (best seen in Fig. 3) may be brazed directly to the arm $a$ or they may be carried by a clip secured to the arm or branch $a$ of the steering-wheel fork.

By the construction and arrangement of parts described and illustrated the stay or support $b\ b^2$ when in its normal position is stationed on and coincides with the arm or branch $a$ and is temporarily locked in that position by the engagement of the rod $e$ with the spring-like clip $g$, the lower tubular part $b^2$ of the stay forming virtually a continuation of the arm or branch $a$ and may when required for use be turned on its hinge-pin $d$, after the disengagement of the rod $e$ from the spring-clip $g$, into the position represented in Fig. 2 and indicated in dotted lines in Fig. 1, so as to form a prop for the bicycle.

To limit the outward motion of the stay or support $b\ b^2$ and to preserve it rigid when in its acting position, a wire or rod $e$ (see Figs. 4 and 5) is jointed to an eye $f^2$ on a clip-like retaining-socket $f$, (shown separately in side and end elevation in Figs. 6 and 7,) fixed to the spindle of the steering-wheel. The said wire or rod $e$, passing through a keyhole-slot $b'$ in the stay or support $b$, extends in the normal position of the parts upwardly and occupies a position alongside the stay or support, the upper end being engaged with a clip $g$. (Best seen in side elevation and plan in Figs. 8 and 9, respectively.) The upper end of the wire or rod $e$ is provided with a handle $e^2$, by which it is manipulated when engaging it with and disengaging it from its holding-clip $g$. The said handle $e^2$ also constitutes a stop for preventing the stay or support escaping past the end of the wire or rod $e$. Below the handle $e^2$ is a reduced or neck portion $e'$, which when the stay $b\ b^2$ takes its supporting position drops into the narrower portion of the keyhole-slot $b'$, and thereby temporarily locks the wire or rod $e$ with respect to the stay $b\ b^2$. The eye $f^2$ instead of forming part of a clip may be in one with the bicycle-frame.

At the top or hinged end of the stay or support $b\ b^2$ is a projecting arm $h\ h^2$, capable of a partial rotation in a bearing $i$ on the stay $b\ b^2$, the rotary motion of the arm being limited by a stop-pin $l$ working in a quadrant-shaped slot in the axis $h^2$ of the projecting arm. The stem portion of the axis of the projecting arm has upon it a torsion-spring $m$.

When the stay or support $b\ b^2$ is turned from its normal or out-of-use position, Fig. 1, into its acting or supporting position, Fig. 2, the handle $h$ of the projecting arm $h\ h^2$ comes in contact with the tire of the front wheel of the bicycle and by its pressure on the tire is partially rotated against the torsional action of its spring $m$. It will thus be understood that when the stay or support $b\ b^2$ is in its acting position it not only constitutes a prop, but it at the same time exerts a slight brake-pressure on the tire and renders the accidental movement of the bicycle practically impossible.

Having now described my invention, what I claim as new, and desire to secure by Letters Patent, is—

1. A bicycle-support comprising an arm pivoted to one of the bifurcations of the steering-wheel fork, and a rod movably secured to the terminal of said bifurcation and engaging at its outer end with the pivoted arm when in its supporting position.

2. A bicycle-support comprising an arm pivoted to one of the bifurcations of the steering-wheel fork, a rod connecting said arm with the bifurcation, and means for securing the rod in its normal position.

3. A bicycle-support comprising an arm pivoted to one of the bifurcations of a steering-wheel fork, a rod connecting said arm with the bifurcation, and a spring-clip carried by the arm for detachably securing the rod in its normal position.

4. A bicycle-support comprising an arm pivoted to one of the bifurcations of the steering-wheel fork, a rod connecting said arm with the bifurcation, and a recess in said arm for seating the rod in its normal position.

5. A bicycle-support comprising an arm pivoted to one of the bifurcations of the steering-wheel fork, and a rod connecting said arm with the bifurcation, said arm having a spring-clip and a seating-recess for holding the rod in its normal position.

6. A bicycle-support comprising an arm pivoted to one of the bifurcations of the steering-wheel fork, a double-eyed clip secured to the spindle of the steering-wheel, a rod attached to one of said eyes and engaging at its outer end with the pivoted arm when in its supporting position.

7. A bicycle-support comprising an arm pivoted to one of the bifurcations of the steering-wheel fork, a keyhole-slot in said arm, a rod movably secured to the terminal of said bifurcation and passing through said slot, the said rod having a terminally-reduced portion for engaging with the narrow part of the keyhole-slot when the pivoted arm is in its supporting position.

8. A bicycle-support comprising an arm pivoted to one of the bifurcations of the steering-wheel fork, a double-eyed clip secured to the spindle of the steering-wheel, a keyhole-slot in said arm, a rod secured to one of the eyes of said clip, and means for engaging the rod with the arm in its supporting position.

9. A bicycle-support comprising an arm pivoted to one of the bifurcations of the steering-wheel fork, a keyhole-slot in said arm, a rod secured to the terminal of the bifurcation and having a handle at its outer extremity, and a clip on said bifurcation for detachably securing the rod in its normal position.

10. A bicycle-support comprising an arm pivoted to one of the bifurcations of the steering-wheel fork, a brace for said arm, and a projection carried by the supporting-arm, said projection having a spindle with a spring thereon and adapted to rotate against torsional action of the spring and engage the tire when the arm is in its supporting position.

In testimony whereof I have hereunto set my hand in presence of two subscribing witnesses.

EDWIN GEORGE MAY.

Witnesses:
RICHARD SKERRETT,
ARTHUR JOHN POWELL.